United States Patent
Jackson et al.

(10) Patent No.: US 9,696,032 B2
(45) Date of Patent: Jul. 4, 2017

(54) SYSTEM AND PROCESS FOR DISPOSAL OF DRY FLY ASH

(71) Applicant: Thumbs Up Ranch, LLC, Bokoshe, OK (US)

(72) Inventors: Kevin Jackson, Bokoshe, OK (US); Chad Jackson, Bokoshe, OK (US); Daryl J. Jackson, Bokoshe, OK (US)

(73) Assignee: Thumbs Up Ranch LLC, Bokoshe, OK (US)

( * ) Notice: Subject to any disclaimer, the term of this patent is extended or adjusted under 35 U.S.C. 154(b) by 0 days.

(21) Appl. No.: 14/170,849

(22) Filed: Feb. 3, 2014

(65) Prior Publication Data

US 2014/0144354 A1    May 29, 2014

Related U.S. Application Data

(63) Continuation of application No. 12/851,877, filed on Aug. 6, 2010, now Pat. No. 8,641,322.

(60) Provisional application No. 61/232,197, filed on Aug. 7, 2009.

(51) Int. Cl.
*B09B 1/00* (2006.01)
*F23J 1/02* (2006.01)

(52) U.S. Cl.
CPC .. *F23J 1/02* (2013.01); *B09B 1/00* (2013.01)

(58) Field of Classification Search
CPC ...... B65F 9/00; B65B 9/00; F23J 1/02; B09B 1/00

See application file for complete search history.

(56) References Cited

U.S. PATENT DOCUMENTS

| | | | |
|---|---|---|---|
| 1,958,561 A | | 5/1931 | Bennett |
| 4,497,308 A | * | 2/1985 | Johnson ..................... F23J 1/04 110/165 R |
| 4,692,061 A | * | 9/1987 | Lindorfer ................ B09B 1/008 405/129.2 |
| 4,727,913 A | * | 3/1988 | Bliss ..................... B65G 69/182 141/286 |
| 4,760,856 A | | 8/1988 | Jocsak |
| 4,997,357 A | | 3/1991 | Eirich et al. |
| 5,351,630 A | * | 10/1994 | Lister et al. .............. 110/165 A |
| 5,387,739 A | | 2/1995 | Pichat |

(Continued)

FOREIGN PATENT DOCUMENTS

| | | | |
|---|---|---|---|
| GB | 2208838 | * | 4/1989 |
| JP | 2003-126797 | * | 5/2003 |

*Primary Examiner* — John Kreck
(74) *Attorney, Agent, or Firm* — Crowe & Dunlevy, P.C.

(57) ABSTRACT

A system and process for disposal of dry fly ash that effectively confines and damps fugitive dust during the collection, sorting, transporting, storage and treatment of fly ash at a landfill. The system and process for disposal of dry fly ash utilizing an enlarged, oversized hopper positioned at the top of a hill and an elongate channel that runs between the enlarged hopper and the landfill. A bulk transport truck hauling a belly dump trailer dumps dry fly ash through an elevated platform having a centrally aligned orifice into the oversized hopper having a slurry rack and a large hopper grate. The ramps and raised platform of the enlarged hopper allow the belly dump trailer compartments to be closer to the orifice and the hopper grate in order to minimize fugitive ash during the disposal process.

24 Claims, 6 Drawing Sheets

(56) References Cited

U.S. PATENT DOCUMENTS 7,424,943 B2 * 9/2008 Gausman et al. ............ 198/311
8,641,322 B1 2/2014 Jackson et al.

* cited by examiner

SYSTEM AND PROCESS FOR DISPOSAL OF DRY FLY ASH

CROSS-REFERENCE TO RELATED APPLICATIONS

This application is a continuation of U.S. patent application Ser. No. 12/851,877, filed Aug. 6, 2010, now U.S. Pat. No. 8,641,322 issued on Feb. 4, 2014, which claims priority to U.S. Provisional Application Ser. No. 61/232,197, filed Aug. 7, 2009, each of which is incorporated herein by reference in its entirety.

BACKGROUND OF THE INVENTION

1. Field of the Invention

This invention relates to a system and process for disposal of dry fly ash, and more particularly, to a system and process for disposal of dry fly ash that effectively confines and damps fugitive dust during the collection, sorting, transporting, storage and treatment of fly ash at a landfill.

2. Description of the Related Art

Fly ash, or pulverised fuel ash as it is known in Europe, is one of the residual by-products generated during the high temperature combustion of coal in electric power generating plants, and more particularly, fly ash is the coal ash that exits a combustion chamber in the flue gas and is captured by air pollution control equipment, such as electrostatic precipitators, baghouses, and wet scrubbers at the power generating plant. The mineral constituents in coal, such as clay, quartz and shale, do not burn, but instead fuse and chemically recombine to form various crystalline and glassy phases of fly ash. Since the particles solidify while suspended in the flue gases, fly ash particles are generally spherical in shape. Fly ash particles typically comprise silicon dioxide ($SiO_2$) (both amorphous and crystalline), aluminum oxide ($Al_2O_3$) and iron oxide ($Fe_2O_3$), along with small quantities of other oxides and alkalies. Fly ash is classified by ASTM as either Class F fly ash or Class C fly ash, with the main difference being the chemical properties of the fly ash resulting from the chemical content of the coal burned. Though a residual by-product, which many consider a waste, fly ash does not have any significant known environmental leaching problems, and with careful management and application, any such problems can be easily overcome.

Fly ash is a pozzolan, i.e., a siliceous or a siliceous and aluminous material that, in the presence of water ($H_2O$) and lime (CaO), will combine to produce a cementious material. Lime often naturally exists in the fly ash or can be supplied by the addition of Portland cement or kiln dust. Fly ash is naturally of low permeability and in many applications is used with a binder, e.g., cement, lime, etc. For example, Class F fly ash typically contains less than 10% lime and requires an activating cementing agent to become a cementious material, whereas Class C fly ash typically contains more than 20% lime and is self-cementing without the addition of an activating cementing agent. The inherent low permeability and pozzolanic binding capacity make fly ash ideal for a wide range of environmental applications, such as ground remediation, landfill liners, road construction, etc.

Fly ash handling and disposal is an issue for the entire coal-burning industry. In the past, fly ash produced during coal combustion was simply entrained in the flue gases and allowed to freely disperse into the atmosphere. However, given the environmental and health concerns surrounding emissions of fly ash, numerous federal and state laws have been enacted to reduce such emissions. In response, coal-burning power plants have implemented various air pollution controls. Even with these air pollution controls, fugitive dust, i.e., solid airborne fly ash particles emitted from sources other than a stack or chimney, remains a problem. Based on the fine particulate nature and relatively low density of fly ash, it can easily be swept away by ordinary air currents, resulting in fugitive dust that ultimately settles in undesirable locations. As a result, the coal-burning industry is still addressing the ever present problem of fugitive dust.

Two (2) methods of handling and disposing fly ash have been predominately utilized in the coal-burning industry to damp and condition fly ash: the "slurry" method and the "dampening" method.

In the slurry method, the fly ash is mixed with water until the mixture has a water content of greater than 90% by weight. This mixture is transported from the power generating plant to a landfill where it stored as a slurry to minimize fugitive dust. The resulting impoundments are typically large and stable, but any breach of their dams is rapid and on a massive scale. For example, in December 2008, a dam breach at an impoundment for fly ash slurry at the Tennessee Valley Authority's Kingston Fossil Plant resulted in a major release of 5.4 million cubic yards of fly ash slurry, resulting in destruction of numerous homes and contaminating the Emory River, having an estimate cleanup cost of over $100 million dollars. A few weeks after the Kingston Fossil Plant incident, a smaller Tennessee Valley Authority impoundment breached, which contaminated the Widows Creek and the Tennessee River. Furthermore, given the large amounts of water needed for the slurry method, the transportation costs for hauling the fly ash slurry from the power generating plant to the landfill are greatly increased over transporting dry fly ash.

In the dampening method, the fly ash is mixed with sufficient amounts of water until the mixture has a water content of about 5% to 20% by weight. The dampening method adds just enough water to the fly ash to calm the fugitive dust. Similar to the slurry method, the costs for transporting the damped fly ash are greatly increased over the costs for transporting dry fly ash. Further, by damping the fly ash at the power generating plant, the damped fly ash may have begun to solidify in transport, prior to being dumped at the landfill.

It is therefore desirable to provide a system and process for disposal of dry fly ash that effectively confines and damps fugitive dust during the collection, sorting, transporting, storage and treatment of fly ash at a landfill.

It is still further desirable to provide a system and process for disposal of dry fly ash that virtually eliminates all fugitive dust when dry fly ash is dumped from a bulk transport truck at a landfill.

Other advantages and features will be apparent from the following summary, drawings and description and from the claims.

BRIEF SUMMARY OF THE INVENTION

In general, in a first aspect, the invention relates to a system for disposal of dry fly ash having a generally enclosed, enlarged hopper, a slurry rack, an elongate channel and at least one fly as damping element with the elongate channel. The enlarged hopper has an upper section, a lower section and a receptacle there between. The upper section of the hopper has a platform with an intake orifice through which dry fly ash is dumped. The slurry rack is disposed within the receptacle of the hopper, and has at least one spray nozzle capable of supplying a sufficient amount of water to aid in damping of the dry fly ash. The elongate channel has an input and an output, with the input in fluid communication with the lower section of the hopper and the output in fluid communication with a fly ash impoundment.

The platform of the upper section of the hopper can be a raised platform having an ingress ramp and an egress ramp. The raised platform further can also have a pair of opposing guide rails aligned substantially perpendicularly to the ingress ramp and the egress ramp, with the guide rails running a length of the raised platform. In addition, the intake orifice may be centrally aligned on the raised platform, intermediate of the ingress ramp and the egress ramp and the guide rails. A pair of substantially upright, opposing wind guards can be secured to the upper section of the hopper, with the wind guards running a length of the platform, similarly to the guide rails. Further, a pair of opposing spray nozzles capable of supplying a sufficient amount of water to aid in damping of the dry fly ash may be adjustable secured to the upper section of the hopper. The water spray nozzles can be in a spaced relation from and also running a length of the platform. The opposing wind guards and the platform may form a generally U-shaped passage being open at the ingress ramp and the egress ramp. In addition, the system can include a substantially upright skirt substantially surrounding a periphery of the intake orifice.

The at least one fly ash damping element within the elongate channel of the system can include at least one mixing element, at least one water sprayer and/or at least one fan. The mixing element may be a series of baffles, paddles, plates, and/or vanes, the water sprayer may be a series of water sprayers along a length of the elongate channel and/or an exhaust spray nozzle, and the fan may be an upstream fan and a downstream fan.

In general, in a second aspect, the invention relates to a process for disposal of dry fly ash by: dumping dry fly ash from a bulk transport truck through an intake orifice in a raised platform into an enlarged hopper; damping at least a portion of the dry fly ash in the enlarged hopper to form a fly ash slurry; passing the fly ash slurry and any remaining dry fly ash in the enlarged hopper downstream to an elongate channel; damping any remaining dry fly ash and the fly ash slurry in the elongate channel; and passing the fly ash slurry to an impoundment.

In addition, the process may include, prior to the step of dumping the dry fly ash from the bulk transport truck, further comprising the steps of: minimizing any air flow between the bulk transport truck and the enlarged hopper with a substantially upright skirt substantially surrounding a periphery of the intake orifice; disrupting any air flow across the raised platform with a pair of substantially upright, opposing wind guards secured to an upper section of the enlarged hopper; and decreasing the distance between the raised platform and the bulk transport truck. Plus, the process may further include the steps of creating a partial vacuum within the elongate channel, and opening an air tight hatch of the bulk transport truck prior to the step of dumping the dry fly ash from the bulk transport truck. Further, the process can include the step of applying a sufficient amount of water to the raised platform and/or the bulk transport truck during the step of dumping the dry fly ash from the bulk transport truck.

The step of damping any remaining dry fly ash and the fly ash slurry in the elongate channel may also include creating a turbulent flow within the elongate channel with at least one mixing element. Furthermore, the process can conducted in a manner effective for releasing less than 10 microns of fugitive dust into the atmosphere.

DETAILED DESCRIPTION OF THE INVENTION

The systems and processes discussed herein are merely illustrative of specific manners in which to make and use this invention and are not to be interpreted as limiting in scope.

While the systems and processes have been described with a certain degree of particularity, it is to be noted that many modifications may be made in the details of the construction and the arrangement of the systems and processes without departing from the spirit and scope of this disclosure. It is understood that the systems and processes are not limited to the embodiments set forth herein for purposes of exemplification.

Figure 1:
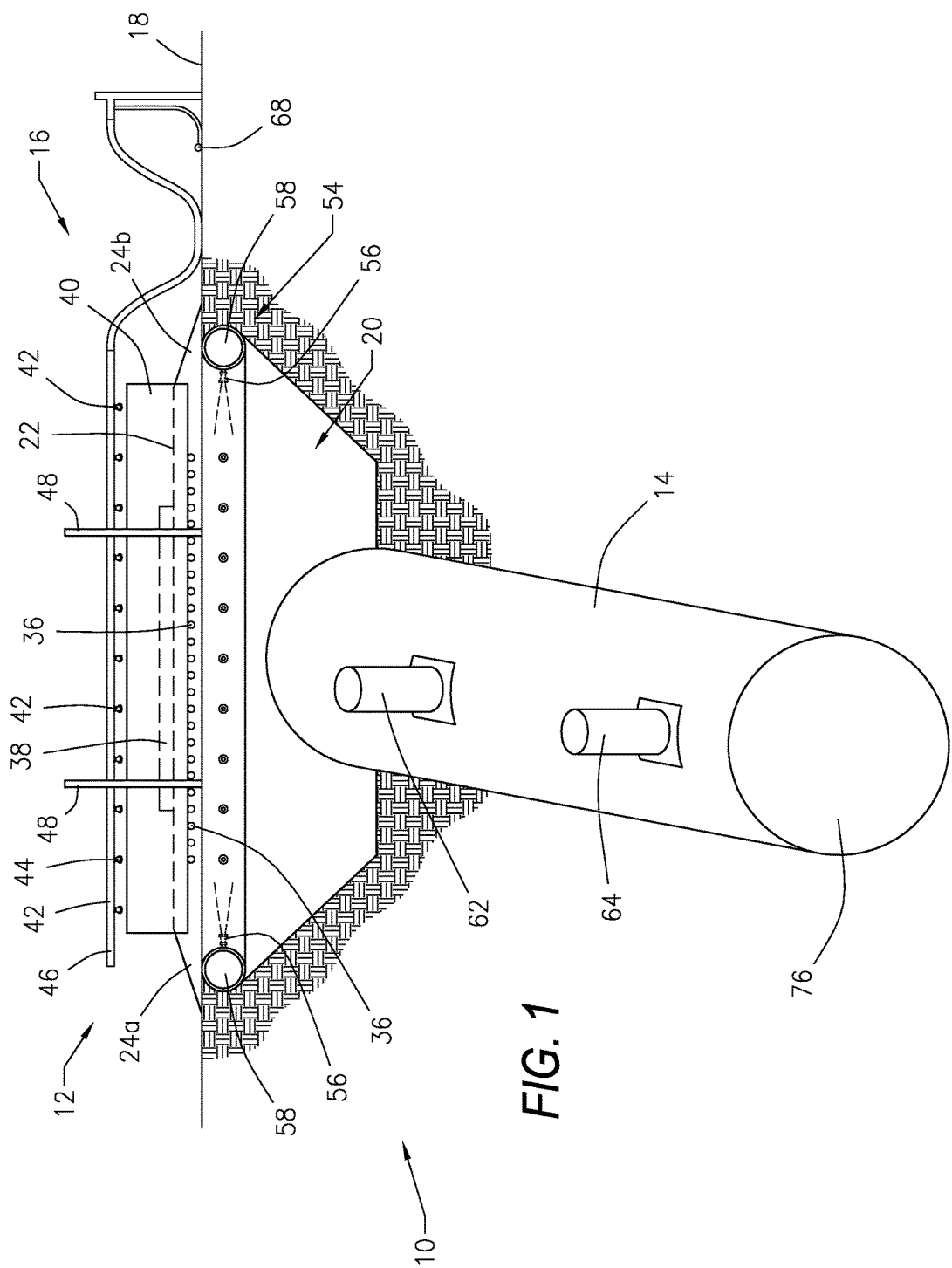
FIG. 1 is a perspective view of an example of an enlarged hopper and an elongate channel in accordance with an illustrative embodiment of the system and process for disposal of dry fly ash disclosed herein.
Figure 2:
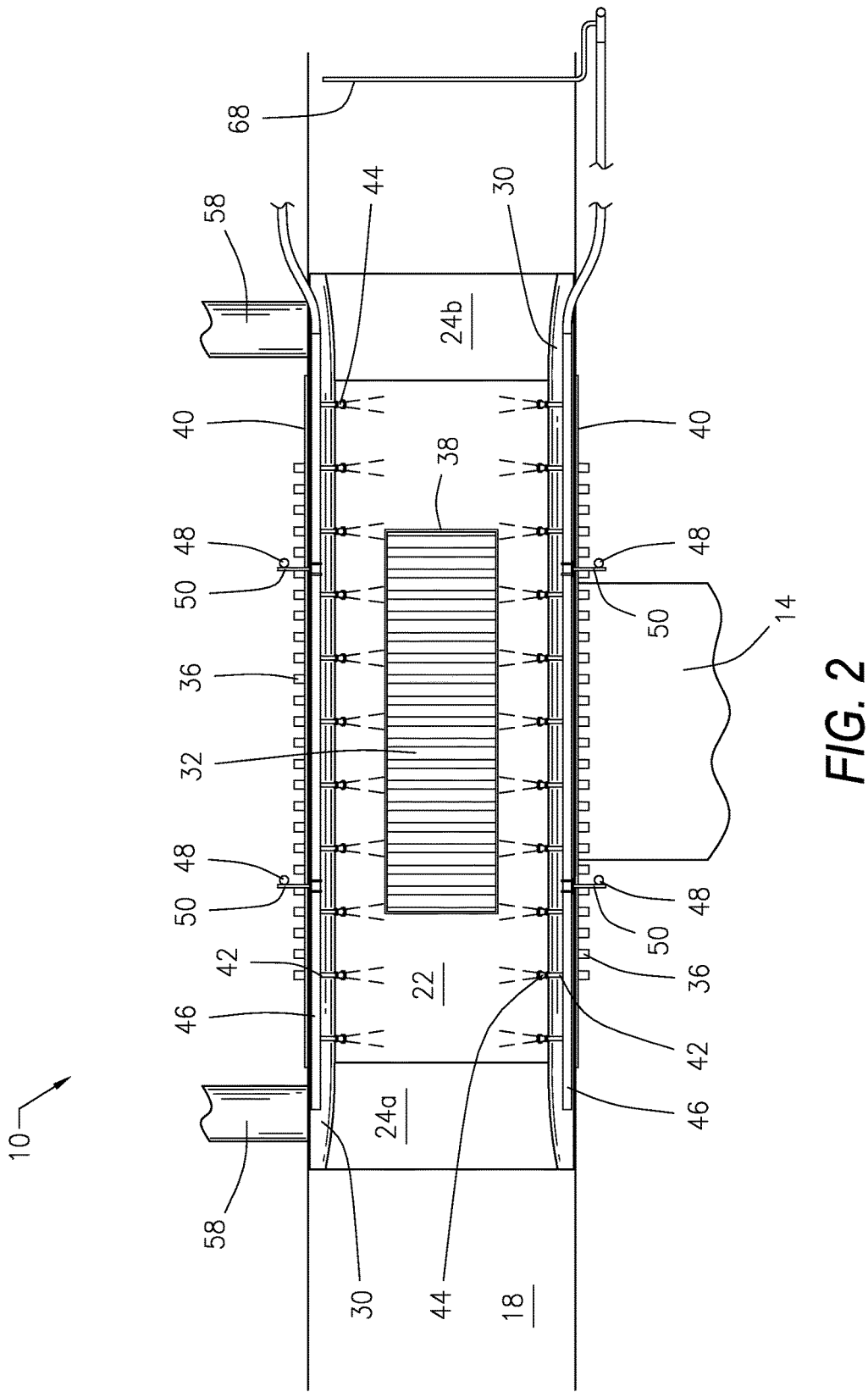
FIG. 2 is a top perspective view of an example of an upper section of an enlarged hopper in accordance with an illustrative embodiment of the system and process for disposal of dry fly ash disclosed herein.
Figure 3:
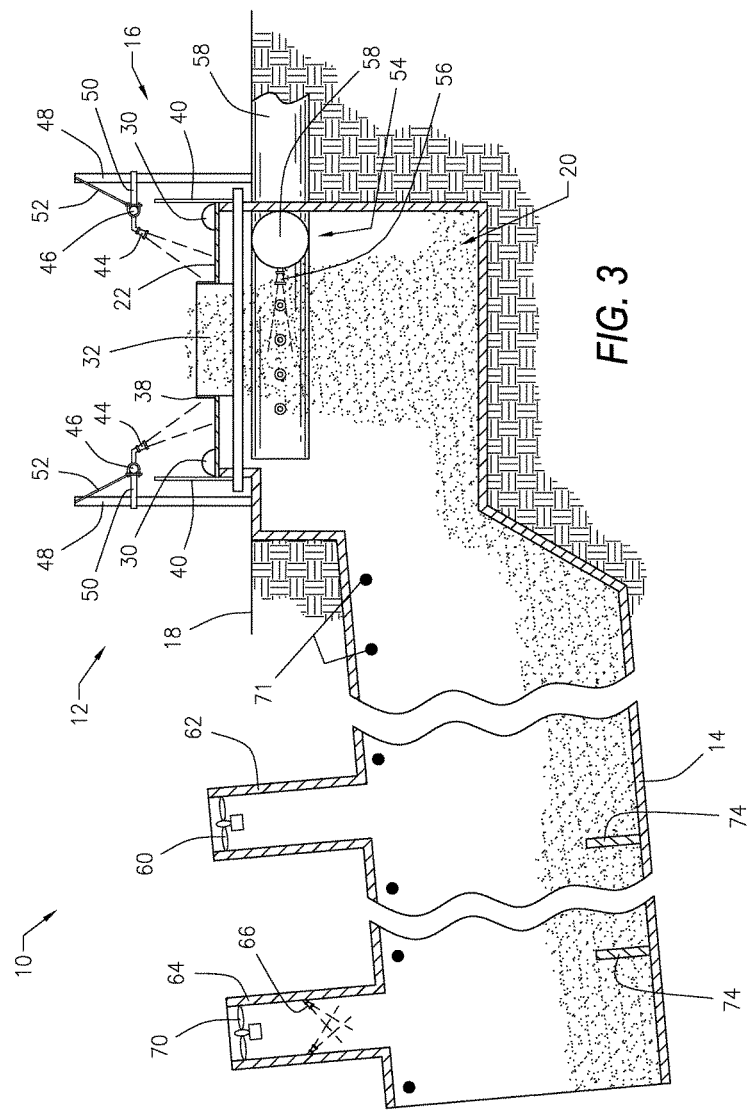
FIG. 3 is a cross-sectional view of an enlarged hopper and an elongate channel in accordance with an illustrative embodiment of the system and process for disposal of dry fly ash disclosed herein.

Referring to the figures of the drawings, wherein like numerals of reference designate like elements throughout the several views, a system for disposal of dry fly ash 10 that effectively confines and damps fugitive dust during the collection, sorting, transporting, storage and treatment of fly ash at a landfill. As illustrated in FIGS. 1 and 3, the system for disposal of dry fly ash 10 includes an enlarged hopper 12 in fluid communication with an elongate channel 14. The enlarged hopper 12 includes an upper section 16 positioned above ground level 18 and a lower section 20 positioned below ground level 18. The upper section 16 of the enlarged hopper 12 includes a raised platform 22 having ramps 24a/b for ingress and egress of a bulk transport truck 26. The bulk transport truck 26 is a pneumatic truck 26 having a belly dump trailer 26a for transporting the dry fly ash from the power generating plant to the landfill. The belly dump trailer 26a has one or more compartments, with each compartment having an air tight hatch 28 on the top.

The raised platform 22 may also include a pair of opposing guide rails 30, aligned substantially perpendicularly to the ingress and egress ramps 24a/b and running a length of the raised platform 22. The guide rails 30 assist in the transport truck 26 in aligning with and maneuvering over and through the upper section 16 of the enlarged hopper 12. The raised platform 22 may also include an orifice 32 and a large hopper grate 34 comprising a series of substantially horizontal rails 36. The orifice 32 may be centrally aligned on the raised platform 22, intermediate of the ingress and egress ramps 24a/b and guide rails 30. The orifice 32 provides the opening for the dry fly ash to be dumped from the belly dump trailer 26a to the receptacle of the enlarged hopper 12. The orifice 32 may include a substantially upright skirt 38 substantially surrounding its periphery to minimize any airflow between the belly dump trailer 26a and the enlarged hopper 12 and thereby control fugitive dust during disposal of the dry fly ash. The upright skirt 38 may be composed of any resilient and/or elastomeric material, such as rubber.

A set of substantially upright, opposing wind guards 40 may also be secured to the upper section 16 of the enlarged hopper 12 to aid in further disrupting any air flow across the raised platform 22 and controlling fugitive dust during disposal of the dry fly ash. The wind guards 40 may run the length of the raised platform 22, substantially parallel to the guide rails 30. An array of spray nozzles 42 may also be adjustably secured to the upper section 16 of the enlarged hopper 12. Each array of spray nozzles 42 may include a plurality of spray heads 44 in fluid communication along a spray head supply pipe 46. The supply pipe 46 may be secured in position by suitable frame members, such as at least one substantially vertical support post 48 having a support arm 50 pivotally attached thereto. Also attached intermediate of the supply pipe 46 and the support post 48 may be a chain 52 to aid in the adjustment of the array of spray nozzles 42. Each array of spray nozzles 42 may be in a spaced relation from the guide rails 30 and run substantially parallel with the guide rails 30 along the length of the raised platform 22. The array of spray nozzles 42 is capable of supplying a sufficient amount of water to aid in the control of fugitive dust during disposal of the dry fly ash, such as approximately 500 gallons of water per minute to the upper section 16 of the enlarged hopper 12.

Figure 4:
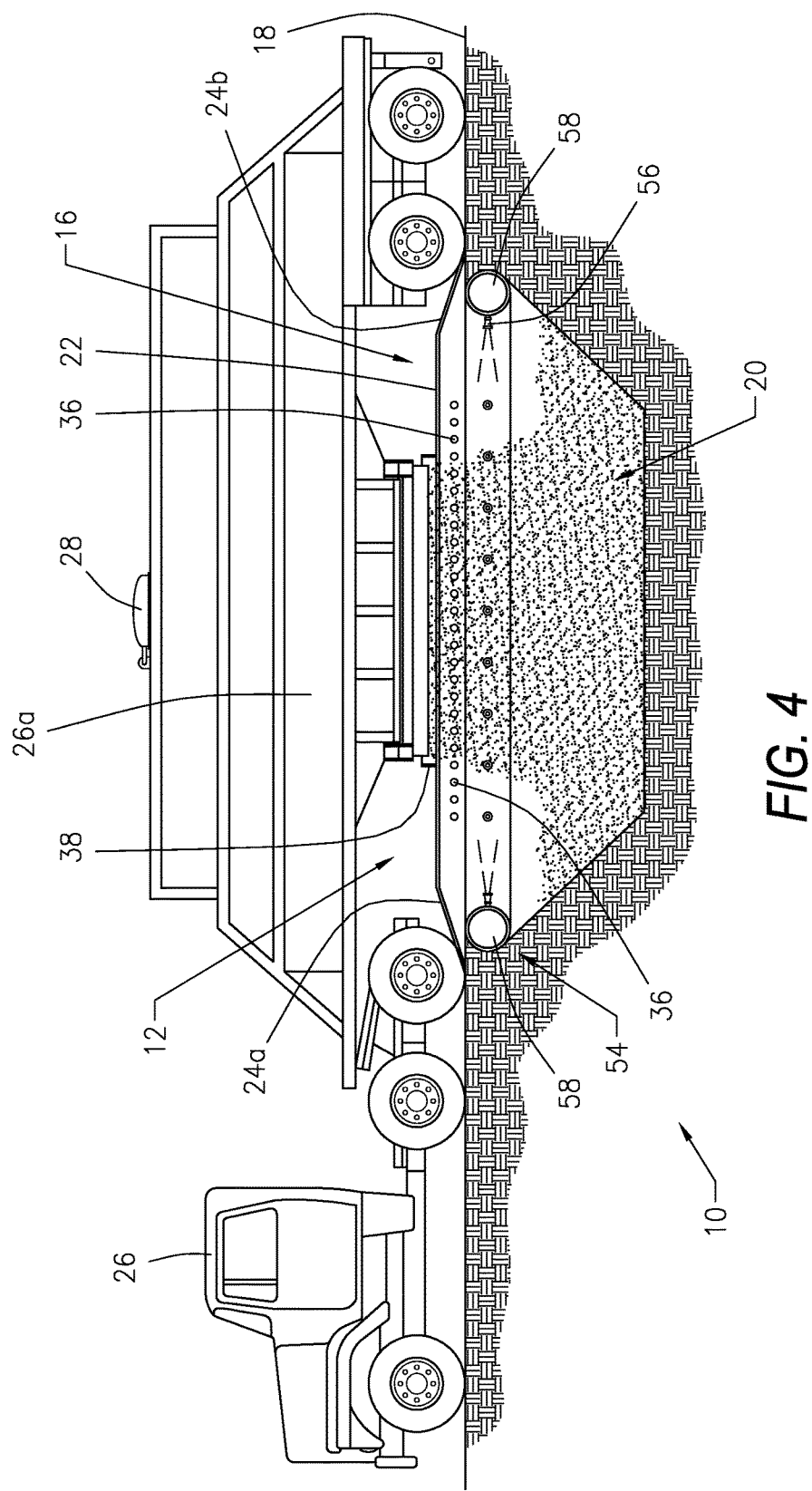
FIG. 4 is a perspective partial cutaway view of an example of a properly positioned bulk transport truck hauling a belly dump trailer in accordance with an illustrative embodiment of the system and process for disposal of dry fly ash disclosed herein.

As shown in FIGS. 3 and 4, the enlarged hopper 12 also includes a slurry rack 54 intermediate of the upper section 16 and the lower section 20. The slurry rack 54 may comprise at least one spray nozzle 56 connected in fluid communication along a high volume water pipe 58. The slurry rack 54 may be secured along the inner periphery of the enlarged hopper 12 and capable of supplying a sufficient amount of water to aid in the damping of the dry fly ash, such as approximately 5,000 gallons of water per minute to the lower section 20 of the enlarged hopper 12. It will be appreciated that the amount of water supplied by the slurry rack 54 is dependent upon a number of factors, including the size and configuration of the lower section 20 of the enlarged hopper 12.

The elongate channel 14 of the system for disposal of dry fly ash 10 includes at least one mixing element (74) to aid in the mixing of the dry fly ash and supplied water. Since dry fly ash has a lower density and weight than water, it tends to float along the top of the supplied water, and therefore does not readily mix without the aid of the mixing mechanisms. The mixing element 74 is located within and along a length of a lower section 20 of the elongate channel 14. For example, the mixing element 74 may include a series of wave turbulence inducing elements, such as baffles, paddles, plates, vanes and/or other implements, which cause a turbulent flow downstream thereof for mixing the supplied water and dry fly ash. The elongate channel 14 may also include at least one fan for creating an air flow downstream of the enlarged hopper 12. As exemplified, an upstream fan 60 may be mounted under an intake cap 62 that allows for fresh air intake. The upstream fan 60 creates a partial vacuum within the elongate channel 14, forcing the dumped, unmixed dry fly ash from the belly dump trailer 26a into the enlarged hopper 12 and along the length of the elongate channel 14. The elongate channel 14 of the system for disposal of dry fly ash 10 may also include a downstream fan 70 and a fan exhaust 64 located downstream of the intake cap 62. The fan exhaust 64 may include at least one exhaust spray nozzle 66 located therein for further providing supplied water to the elongate channel 14 to damp any remaining unmixed, dry fly ash. A series of fine mist sprayers 71 may also be included along the length of the elongate channel 14. In addition, a terminal end of the elongate channel 14 opposite the enlarged hopper 12 may be a flexible closed end 76 that allows mixed fly ash and water slurry to pass but entraps unmixed fugitive dust for further processing.

Figure 5:
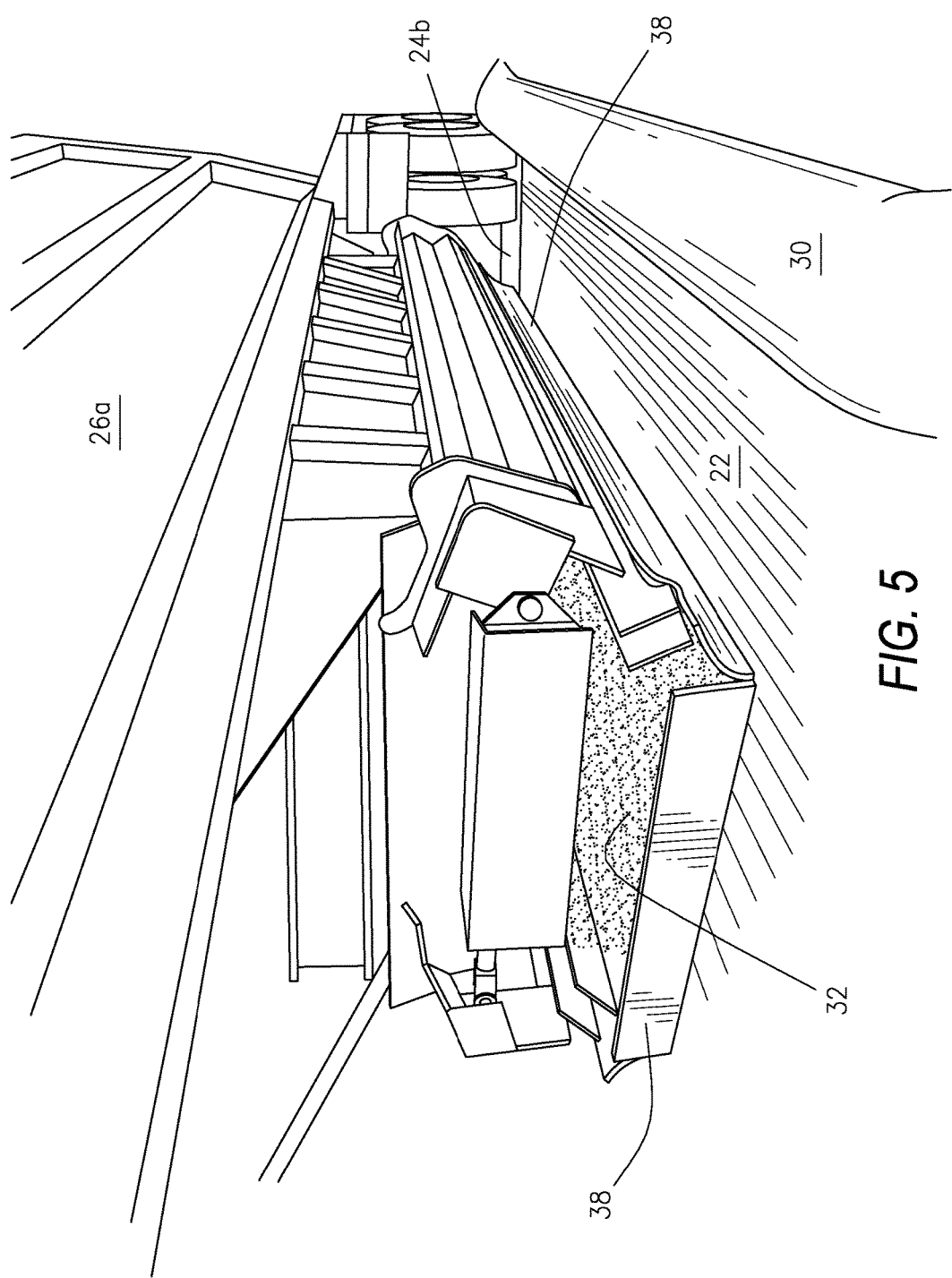
FIG. 5 is a perspective view of a seal between a compartment of a belly dump trailer and a substantially upright skirt surrounding the periphery of an orifice in accordance with an illustrative embodiment of the system and process for disposal of dry fly ash disclosed herein.
Figure 6:
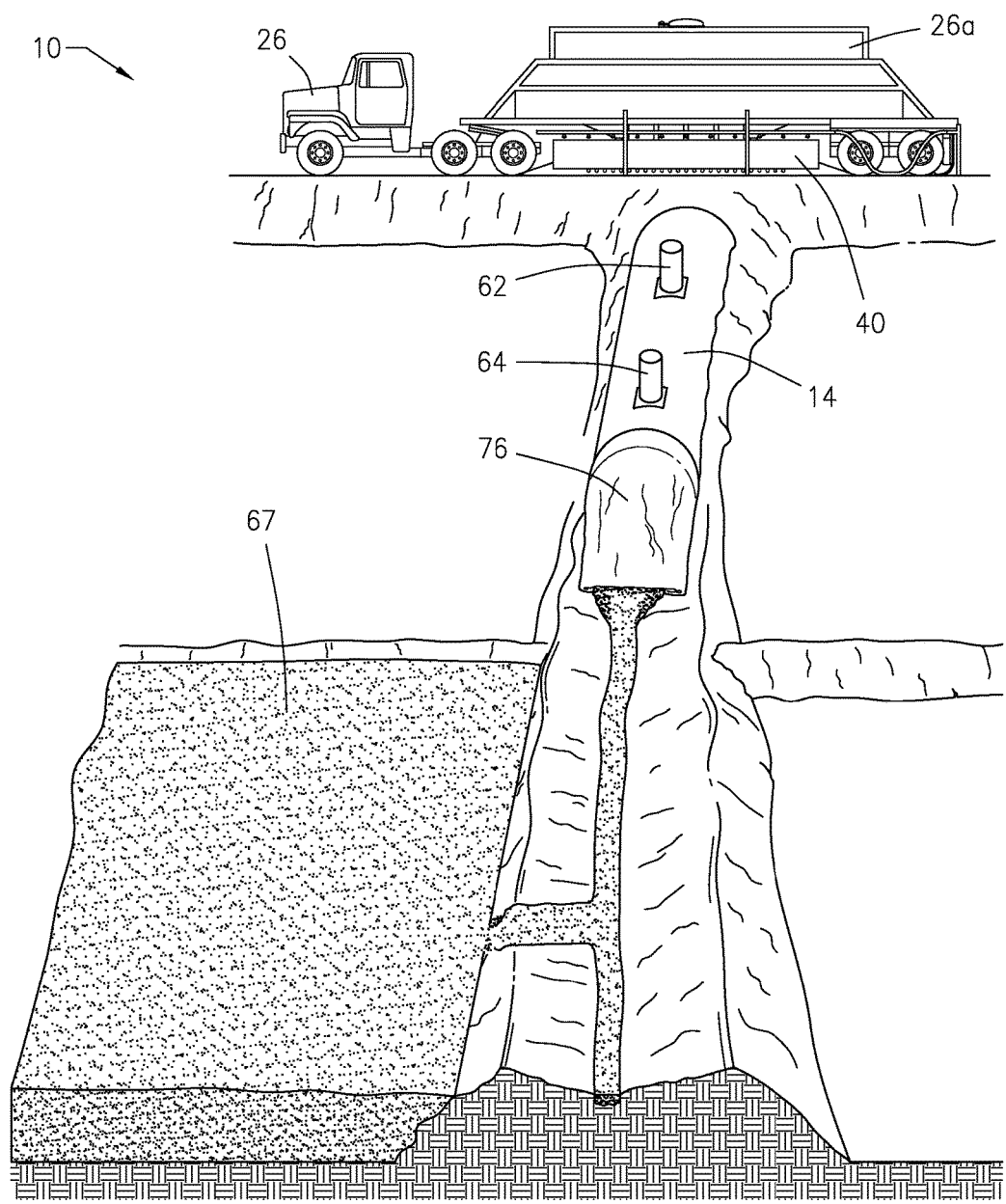
FIG. 6 is a perspective view of an elongate channel and impoundment in accordance with an illustrative embodiment of the system and process for disposal of dry fly ash disclosed herein.

Referring now generally to FIGS. 4 through 6, a process for disposal of dry fly ash 10 that effectively confines and damps fugitive dust during the collection, sorting, transporting, storage and treatment of fly ash at a landfill includes having the bulk transport truck 26 position the belly dump trailer 26a such that the bottom of the compartment is aligned over the orifice 32 of the raised platform 22 of the upper section 16 of the enlarged hopper 12. As the transport truck 26 is positioned, the wheels may pass over a pressurized line 68 that causes water to be supplied to the system 10, including the array of spray nozzles 42, the slurry rack 54, the exhaust spray nozzle 66 and/or the series of fine mist sprayers for a predetermined amount of time, such that they system 10 is automated upon arrival and positioned of the transport truck 26. Water may be supplied to the system 10 via a water pump (not shown) in fluid communication with a reservoir 72. Since the raised platform 22 is elevated from ground level 18, the distance between the bottom of the compartment of the belly dump trailer 26a is closer to the orifice 32 of the raised platform 22 than it would otherwise be. The substantially upright skirt 38 further decreases the distance between the bottom of the compartment of the belly dump trailer 26a and the orifice 32 of the raised platform 22, thus further minimizing fugitive dust. Finally, the air bags of the belly dump trailer 26a may be deflated in order to further decrease the distance between the raised platform 22 of the system 10 and the belly dump truck 26, thus further controlling dry fly ash during disposal.

Once properly positioned, the air tight hatch 28 on the top of the belly dump trailer 26a is opened in order to prevent a vacuum from being pressurized within the belly dump trailer 26a. The compartments of the belly dump trailer 26a are then opened to allow the dry fly ash to be dumped through the orifice 32 of the raised platform 22 and into the enlarged hopper 12. As can be seen in FIG. 5, the compartment doors of the belly dump truck 26 contact the upright skirt 38, forming a partial seal that further impedes the escape of any fugitive dust. The combination of the substantially upright skirt 38 surrounding the periphery of the orifice 32, the raised platform 22, the deflated air bags, the pair of opposing wind guards 40 and/or the array of spray nozzles 42 of the upper section 16 of the enlarged hopper 12 ensure that any fugitive dust present during disposal of the dry fly ash is controlled and minimized.

As the dumped dry fly ash passes through the orifice 32 of the raised platform 22 to the lower section 20 of the enlarged hopper 12, the water supplied via the slurry rack 54 acts to damp the disposed dry fly ash. As the dry fly ash enters the enlarged hopper 12, the high volume of water supplied by the slurry rack 54 causes mixing, thereby preventing the creation of fugitive dust. The water and fly ash slurry flows downstream into the elongate channel 14. The upstream fan 60 mounted in the elongate channel 14 creates a partial vacuum within the elongate channel 14 and the enlarged hopper 12, causing the fly ash to be pulled from the belly dump trailer 26a and into the enlarged hopper 12. Any unmixed dry fly ash is forced downstream within the elongate channel 14 where it may be damped prior to exiting the elongate channel 14.

Since fly ash is less dense than water, the dry fly ash tends to settle on top of the water without mixing. The mixing element 74 within the elongate channel 14 cause a turbulent flow of the water, and thereby cause additional mixing of the dry fly ash and water. The fine mist sprayers included along the length of the elongate channel 14, if present, act to further damp the fly ash. As a final preventative measure, any dry fly ash that is still unmixed is captured in the fan exhaust 64 where it is damped by the exhaust spray nozzle 66 located therein. The system and process for disposal of dry fly ash 10 results in less than ten (10) microns of fugitive dust released into atmosphere.

The resulting water and fly ash slurry flows from the elongate channel 14 where it may be further mixed downstream with additional water, such as refuse water from oil and gas production sites, as shown in FIG. 6. This mixture is allowed to flow into a hold pond (impoundment) 67 where it is exposed to ambient conditions and allowed to dry and harden.

Whereas, the systems and processes have been described in relation to the drawings and claims, it should be understood that other and further modifications, apart from those shown or suggested herein, may be made within the scope of this invention.

What is claimed is:

1. A system for disposal of dry fly ash, said system comprising:
    a hopper having an intake through which dry fly ash is dumped and mixed with water;
    a generally cylindrical, elongate channel comprising an upper terminal end and a lower terminal end; said upper terminal end of said elongate channel connected to and in fluid communication with said hopper; said lower terminal end of said elongate channel connected to and in fluid communication with a fly ash impoundment, said elongate channel comprising at least one fan for creating a partial vacuum within said channel using an air flow within said elongate channel downstream of said hopper; and
    at least one fly ash mixing element located within and along a length of a lower section of said elongate channel.

2. The system of claim 1 wherein said at least one mixing element is configured to cause a turbulent flow of said fly ash along said length of said lower section of said elongate channel.

3. The system of claim 2 wherein said at least one mixing element is a series of baffles, paddles, plates, vanes or a combination thereof.

4. The system of claim 1 wherein said at least one fan comprises an upstream intake fan and a downstream exhaust fan.

5. The system of claim 4 wherein said upstream intake fan is positioned within an air intake cap of said elongate channel.

6. The system of claim 4 wherein said downstream exhaust fan is positioned in a fan exhaust downstream of said upstream intake fan.

7. The system of claim 6 further comprising an exhaust spray nozzle positioned within said fan exhaust of said elongate channel.

8. The system of claim 1 further comprising a flexible closed end at said lower terminal end of said elongate channel.

9. The system of claim 8 wherein said flexible closed end is configured to pass mixed fly ash and water slurry to said impoundment and configured to entrap any remaining unmixed fly ash in said elongate channel.

10. The system of claim 1 further comprising at least one mist sprayer positioned along the length of said elongate channel.

11. A process for disposal of dry fly ash, said process comprising the steps of:
    dumping dry fly ash from a bulk transport truck into an enlarged hopper;
    creating a partial vacuum within a generally linear and cylindrical, elongate channel using at least one fan for creating an air flow downstream of said enlarged hopper, said elongate channel having an upper end connected to and in fluid communication with said hopper and a lower end fluidly connected to an impoundment;
    damping at least a portion of said dumped fly ash in said elongate channel using at least one mist sprayer positioned along the length of said elongate channel and using a turbulent flow within said elongate channel produced by at least one mixing element, said mixing element located within and along a length of a lower section of said elongate channel; and
    passing said fly ash to said impoundment.

12. The process of claim 11 further comprising the step of:
    opening an air tight hatch of said bulk transport truck prior to said step of dumping said dry fly ash from said bulk transport truck.

13. The process of claim 11 wherein said at least one mixing element is a series of baffles, paddles, plates, vanes or a combination thereof.

14. The process of claim 11 wherein said partial vacuum within said elongate channel is created by an upstream intake fan for creating an air flow downstream of said enlarged hopper.

15. The process of claim 14 wherein said upstream intake fan is positioned within an air intake cap of said elongate channel.

16. The process of claim 15 further comprising a downstream exhaust fan positioned within a fan exhaust positioned downstream of said air intake cap.

17. The process of claim 16 further comprising the step of damping said fly ash in said fan exhaust using an exhaust spray nozzle positioned therein.

18. The process of claim 11 further comprising the step of damping said fly ash within said elongate channel using a flexible closed end at said lower end of said elongate channel.

19. A process for disposal of dry fly ash, said process comprising the steps of:
    generating a partial vacuum within a generally, elongate channel using an upstream intake fan for creating an air flow downstream of an enlarged hopper, wherein said upstream intake fan is positioned within an air intake cap of said elongate channel, and further comprising a downstream exhaust fan is positioned within a fan exhaust positioned downstream of said air intake cap;

passing said fly ash from a bulk transport truck to said elongate channel;

mixing at least a portion of said fly ash and a high volume of water using a turbulent flow directly within said elongate channel, said turbulent flow produced by a plurality of mixing elements located along a length of said elongate channel; and passing said fly ash to an impoundment.

20. The process of claim 19 wherein said step of mixing said fly ash in said elongate channel further comprises the step of creating a turbulent flow of said water within said elongate channel with said mixing element.

21. The process of claim 19 wherein said at least one mixing element is a series of baffles, paddles, plates, vanes or a combination thereof.

22. The process of claim 19 further comprising the step of damping said fly ash in said fan exhaust using an exhaust spray nozzle positioned therein.

23. The process of claim 19 further comprising the step of damping said fly ash within said elongate channel using a flexible closed end at a terminal end of said elongate channel.

24. The process of claim 19 wherein said step of mixing said fly ash in said elongate channel further comprises the step of damping said dry fly ash in said elongate channel using at least one mist sprayer positioned along the length of said elongate channel.

\* \* \* \* \*